(No Model.) 6 Sheets—Sheet 1.

A. A. BARKER.
APPARATUS GOVERNED BY ELECTRICITY FOR FLUSHING WATER CLOSETS.

No. 342,495. Patented May 25, 1886.

(No Model.)

A. A. BARKER.

APPARATUS GOVERNED BY ELECTRICITY FOR FLUSHING WATER CLOSETS.

No. 342,495. Patented May 25, 1886.

Witnesses;
Walter B. Nourse.
Lucius W. Briggs.

Inventor;
Albert A. Barker.

(No Model.) 6 Sheets—Sheet 6.

A. A. BARKER.
APPARATUS GOVERNED BY ELECTRICITY FOR FLUSHING WATER CLOSETS.

No. 342,495. Patented May 25, 1886.

Witnesses:
Walter B. Nourse,
Lucius W. Briggs.

Inventor:
Albert A. Barker.

UNITED STATES PATENT OFFICE.

ALBERT A. BARKER, OF WORCESTER, MASSACHUSETTS, ASSIGNOR OF ONE-HALF TO NATHANIEL G. TUCKER & SON, OF SAME PLACE.

APPARATUS GOVERNED BY ELECTRICITY FOR FLUSHING WATER-CLOSETS.

SPECIFICATION forming part of Letters Patent No. 342,495, dated May 25, 1886.

Application filed March 1, 1886. Serial No. 193,616. (No model.)

*To all whom it may concern:*

Be it known that I, ALBERT A. BARKER, of Worcester, in the county of Worcester and State of Massachusetts, have invented an Improved Apparatus Governed by Electricity for Flushing Water-Closets; and I do hereby declare that the following is a full, clear, and exact description of the same, reference being had to the accompanying drawings, forming a part of this specification, and in which—

My invention relates to apparatuses used in combination with tanks or cisterns for flushing water-closets.

The object thereof is to provide means whereby said tanks or cisterns may be placed in any desired location in a building above the level of the water-closets supplied therefrom; to admit of several water-closets being supplied from one tank, if desired, instead of from separate tanks for each closet, as ordinarily, and to reduce the cost of such flushing-tanks or cisterns producing like or similar results to the one made in accordance with my invention.

Said invention consists of an apparatus governed by electricity, and combined with the usual valve of a water-closet supply tank or cistern, having ordinary means for automatically regulating the water-supply thereto, whereby said valve may be opened and closed in flushing the bowl of said water-closet, as hereinafter more fully set forth. It is more especially adapted for use with a valve having a siphon connected therewith, and I thus prefer to apply the same in practice. Said valve and the means for carrying off the discharge may be of any ordinary well-known construction and arrangement, and therefore constitute no part of my invention except when used in combination therewith, as hereinafter described.

My said improved apparatus comprises in combination the following main or essential features, the elements of which may be varied more or less, as desired, to suit different tastes and requirements, as hereinafter described, without departing from the principle of my invention: first, an ordinary float connected with and adapted to raise the valve of a flushing-tank or cistern from its seat, thus opening the same to produce the wash, said valve being held under water when in its normal position, and its chain or other connection between the same and the valve so regulated that when it is released from its depressed position, as hereinafter described, it will ascend a given distance by the buoyancy thereof, thereby raising the valve with the above result; second, means for guiding said float so that it will ascend and descend with the rise and fall of the water, as hereinafter described, in substantially a vertical line, the supply of water to the tank being automatically regulated by means of an ordinary float, lever, and cock, in the usual way; third, a hinged lever having an armature mounted thereon, and adapted to hold the float connected with the valve in a depressed position under water, to release the same to open said valve when operated, as hereinafter described, and to allow said float to descend with the water after the operation above referred to, so that its contact-point with said lever will come below the holding part of the latter, and thus stop and hold the float in its normal position with its valve seated or closed, when said float reascends with the rise of the water, said hinged lever also being adapted to quickly spring back when released, and assume its normal position after each operation of releasing the float from its depressed position prior to its reascending with the water after the valve is closed, as hereinbefore described; fourth, means for governing the upward movement of the float connected with the valve when said float is released from its depressed position under water, and thereby regulating the distance that said valve is raised above its seat, for the purpose hereinafter described, in addition to that before stated, also, means for controlling the downward movement of the float; and, fifth, an ordinary electro-magnet having the usual wire connections with an ordinary galvanic battery, and with a circuit-breaker in turn connected in any well-known way with the water-closet door, with its seat or a push-button conveniently arranged for operation, whereby, when the circuit through said magnet is closed by pressure upon its circuit-breaker, the armature mounted on the hinged lever, hereinbefore referred to, is attracted toward said magnet, thus causing the lever to swing upon its pivot, which operation withdraws its holding part from contact with the float or any part projecting therefrom to said holding part of the lever, and, in consequence, releasing the float from its depressed position with the result hereinbefore stated, and whereby, when said circuit is reopened and the power of attraction withdrawn from said magnet by removing the pressure from its circuit-breaker the hinged lever is permitted to assume its normal position, ready to stop the next upward movement of the float as it reascends, and hold it under water preparatory to again flushing the closet.

To enable those skilled in the art to which my invention appertains to make and use the same, I will now proceed to describe it more in detail.

Referring to the drawings, A represents an ordinary tank having a common self-closing cock and float, B, for automatically regulating the supply of water to said tank by the rise and fall of said float with the water in the usual way.

The part marked C represents a valve of ordinary construction having a siphon, D, connected therewith in the usual way, said siphon being operated to produce a flow of water through the same from the tank by raising the valve the necessary distance to admit of a sufficient discharge of water at that point to produce the required suction to set the siphon in operation. The amount of water discharged may be regulated by lengthening or shortening the shorter arm, c, of said siphon, the deeper that its inlet is extended down into the water, the greater being the wash or amount of water discharged, and vice versa, for a smaller discharge, as will be obviously seen. In this instance I have shown a tube, d, fitted over the lower end of the arm c of said siphon, which may be adjusted up and down, as desired, to produce the required wash. Said tube is fitted sufficiently tight over the surface of the siphon to prevent any air-suction between said parts liable to impair the action thereof, and to prevent its moving out of position after adjustment.

If preferred, any other suitable and convenient method of adjusting the wash may be adopted in lieu of that above described, the same constituting no part of my invention, except in combination with my improvements, as hereinbefore stated.

My said invention relates only to the means employed for raising and lowering the valve C for the purpose described, said means consisting of an apparatus governed by electricity, and in part operated by the rise and fall of the water in the tank, as hereinafter described.

Said apparatus is constructed and arranged to operate in the following manner: An ordinary float, E, is connected by means of a chain, e, or otherwise with the valve C, and said float is arranged to be raised and lowered by the rise and fall of the water in the tank in a vertical line or substantially so over the center of said valve. Various ways may be employed for thus guiding said float, and I therefore do not limit myself to any special method.

Figures 4, 7:
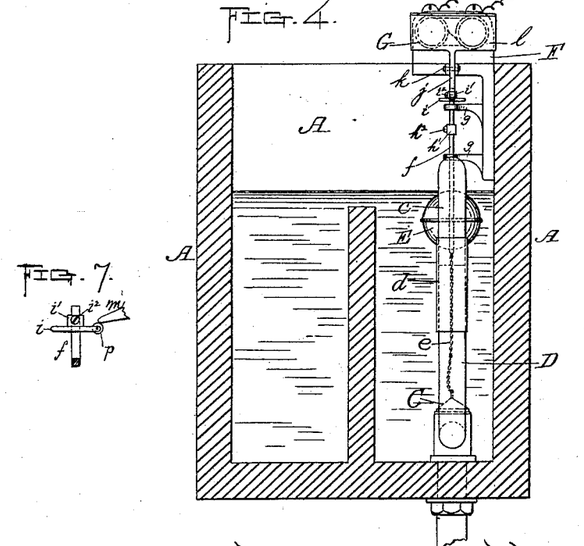
Fig. 4 represents a vertical transverse section through the tank shown in Fig. 2, taken on line *b b*, looking in the direction indicated by arrow *b'*, same figure, showing a side view of my improved apparatus.
Figs. 7, 8, 9, 10, 11, 12, and 13 represent modifications of the apparatus, which will be hereinafter more fully explained.
Figures 5, 6:
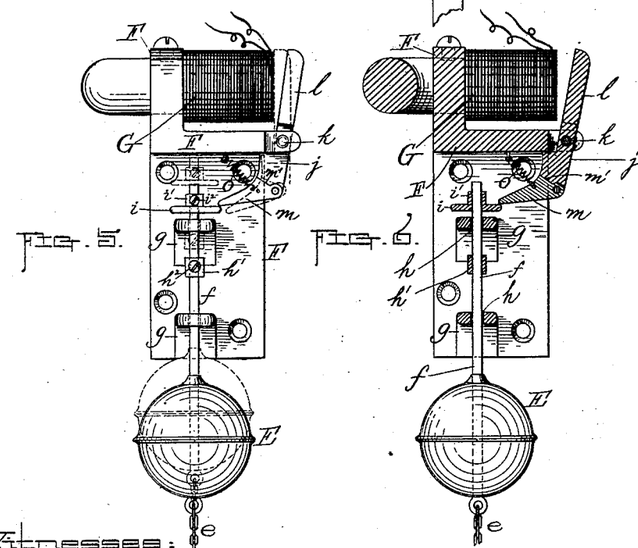
Fig. 5 represents upon an enlarged scale a front view of my improved apparatus alone, disconnected from the tank and its valve, the operation of the same being shown by full and dotted lines, as hereinafter described.
Fig. 6 represents upon the same enlarged scale as Fig. 5 a vertical section through the apparatus shown at the left-hand side of Figs. 2 and 3, taken on line *c'* of Fig. 2.
Figure 12:
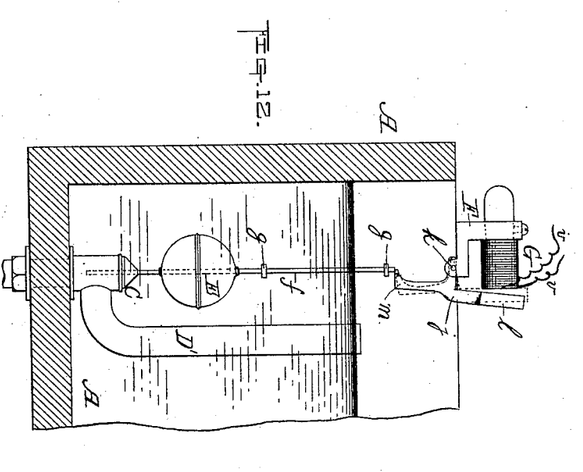
Figure 13:
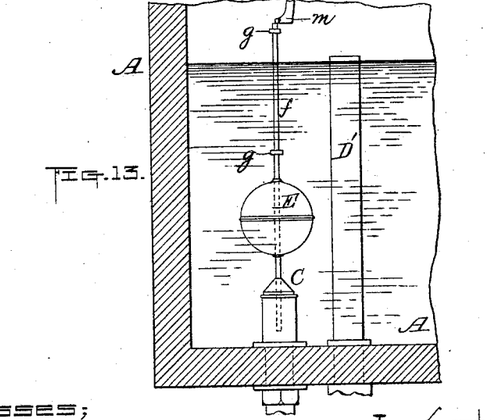

In the first six figures and Figs. 12 and 13 of the drawings I have shown a rod, f, extending up through the float (to more firmly secure the same thereto) and thence up vertically in a straight line a sufficient distance to insure an easy vertical movement in the bearings g g, through which it passes, and to further facilitate said operation, the vertical openings h in the bearings are made a trifle larger than the rod, as shown in Fig. 6. Said bearings may be formed upon or secured to the frame-work F of the apparatus or secured directly to the tank, as preferred, care being taken to arrange the guide-openings in a straight vertical line to prevent the rod $f$ from binding therein.

Figure 1:
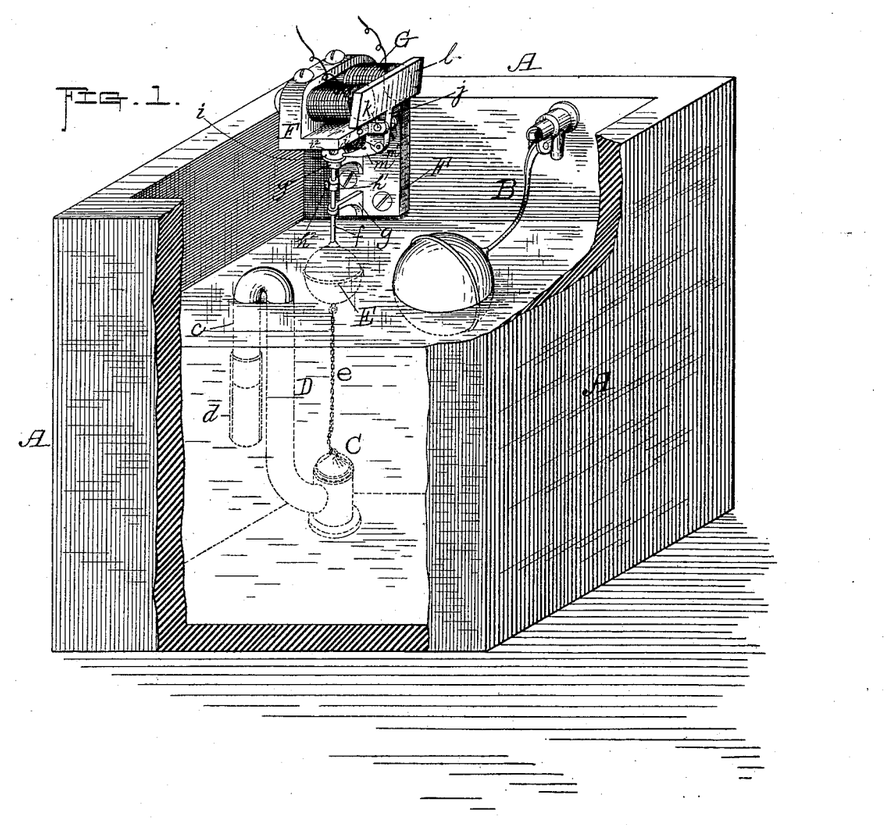
Figure 1 represents a perspective view of an ordinary flushing-tank for water-closets with my improvements applied thereto, said tank being partially broken away upon the front side to more fully illustrate my said improvements hereinafter described.
Figure 2:
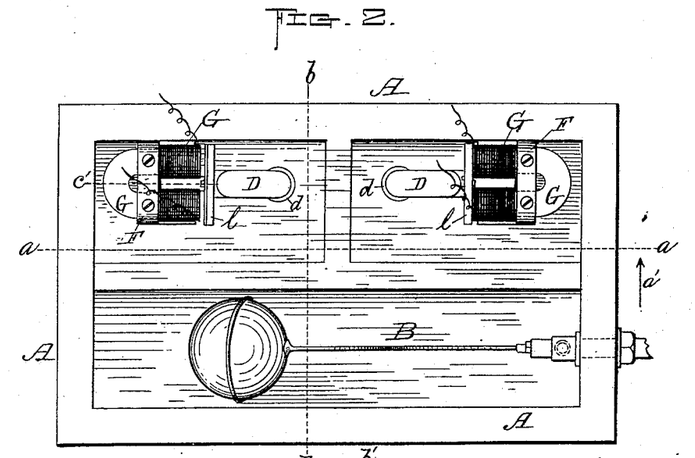
Fig. 2 represents a top or plan view of a tank with two of my improved apparatuses applied thereto, said tank being divided into separate compartments for the purpose hereinafter stated, and also provided, as in Fig. 1, with the usual float and cock for automatically regulating the supply of water thereto.

When the water in the tank is at its maximum height with its supply shut-off a little below its overflow-level, as shown in Fig. 1, and the apparatus not in use, the float E is held in a depressed position below its natural floating-level in the manner hereinafter described. Therefore, when released from said depressed position, as also hereinafter described, it at once ascends by the buoyancy thereof, and this constitutes the motive power which I employ for raising the valve, the connecting-chain $e$ between said parts being so regulated as to raise said valve with the float when the latter ascends, as above stated.

Greater or less lifting-power may be obtained by increasing or decreasing the size of the float and by holding it in a submerged position at a greater or less depth, as will be obviously seen.

In practice, I prefer to so regulate said float as to enable it, if required, to lift about double the combined weight of the valve and chain $e$, thus positively insuring the raising of said valve in every instance when said float is set free from its depressed position, even though considerable resistance is offered, not usually experienced in performing said operation.

To further facilitate the above operation, I fasten the chain $e$ so as to be a little slack when the float is depressed, as aforesaid. Therefore, when said float is released or set free it, naturally springing upward with a quick movement, and pulling the chain taut with a jerk, causes the valve to be started from its seat.

Another advantage of arranging the chain so as to be a little slack, as aforesaid, is that when not in use it allows the valve to remain well seated, no upward strain being imparted to it by the movement of the water in the tank, of which there would be some liability were such a provision not made, a slight movement being caused by the inflowing water through the supply-cock thereof. It will be understood that said cock and its float are so regulated that the supply is stopped when the float is raised, so that the level of the water comes a little below the overflow-line in the usual way.

The upward movement of the float E and parts connected therewith is governed by means of an adjustable stop, which may be constructed and arranged to perform the above office in any well-known manner. In this instance I have shown in the first six figures before referred to a collar, $h'$, upon the rod $f$, which may be fastened in any desired position under one of the bearings $g$ by means of a set-screw, $h^2$, the distance that it is fastened from said bearing-point when the parts are in their depressed position being the distance, minus the slackness in chain $e$, that the valve will be raised from its seat when the float is released from said depressed position. A similar method may be adopted, if desired, for regulating the downward movement of the aforesaid parts. In this instance I have shown a disk, $i$, mounted on the upper end of the rod $f$ for the purpose stated, and also for another purpose, hereinafter described, said disk being provided with a collar, $i'$, by means of which and a set-screw, $i^2$, it may be fastened to said rod in any adjusted position.

The float E is held in a depressed position under water, as hereinbefore described, by means of a lever, $j$, hinged on a pivot-pin, $k$, to the frame-work F of the apparatus. Upon said lever, at a convenient place for operation in connection with an ordinary electro-magnet, G, is formed or secured an armature, $l$. It is also provided with a projecting part, $m$, adapted to bear upon and hold the float in its depressed position by said float or any part projecting therefrom bearing upon the under side thereof when pressed upward by the water, as hereinbefore described, and shown in the drawings.

The lever $j$ is so constructed that the end of its projecting part or finger $m$ will just overlap the bearing part of the float when its armature is disconnected from the magnet. Therefore it is obvious that, when the electric circuit through said magnet is closed in the usual way, said armature is attracted thereto, and in consequence the holding part of the lever is withdrawn from the bearing part of the float by the swinging of said lever on its pivot, thereby releasing said float, which at once springs upward to its stopping point, carrying the valve with it, which operation causes the water-closet to be flushed, as hereinbefore described.

The lever $j$ is prevented from swinging beyond its normal position (best shown in Fig. 6) by coming in contact with the frame-work F, being adjusted, when made, so as to strike said stopping-point when the armature $l$ is at the desired distance from the magnet.

By the use of a lever, $j$, constructed and arranged as hereinbefore described, it will be seen that but little motion of said lever is necessary to release the float. The armature may therefore be arranged quite close to the poles of the magnet and considerably within the limits of its power of attraction, in consequence of which a comparatively small magnet and battery may be employed to operate the apparatus.

A two-cell battery, K, (see Fig. 14,) such as is ordinarily employed in nearly all modern dwellings and other buildings for operating the electric bells thereof, is more than sufficient to produce the requisite electric current through the conducting-wires $v$ $v$ to properly operate the apparatus.

Figures 9, 10:
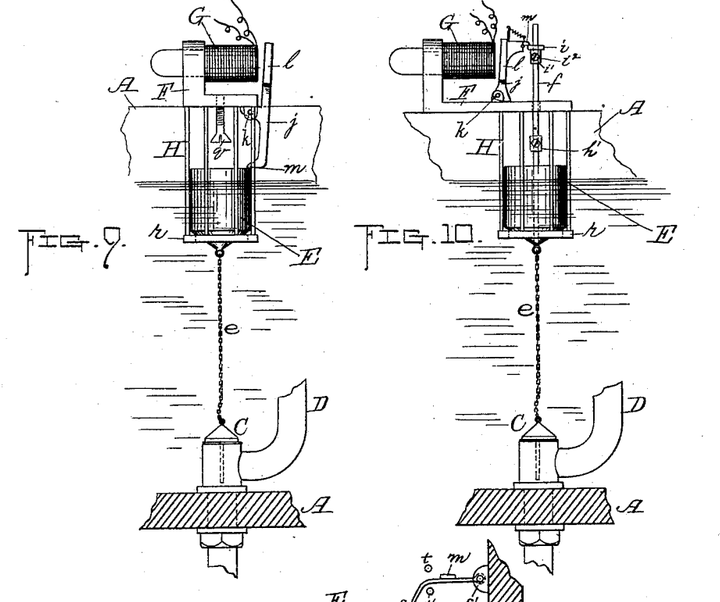

The lever $j$ is made to spring back with a quick motion, and assumes its normal position when released by the magnet by means of a light spring, o, fastened at one end to said lever and at its other end to some stationary part; or, if preferred, it may be so hinged as to assume said position when allowed to do so by its own weight and force of gravity, as shown in the modifications, Figs. 9 and 10.

Figure 11:
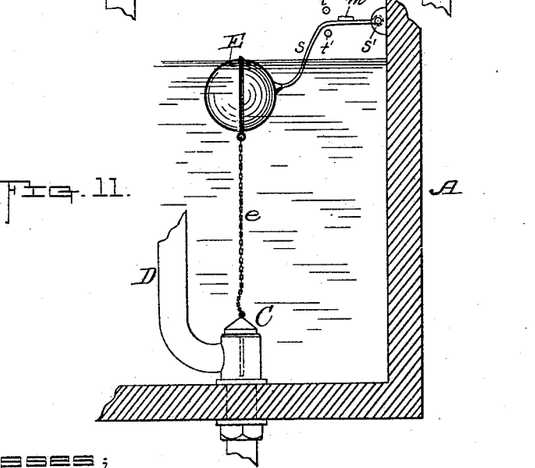

When the construction and arrangement adopted is similar to that shown in the first six figures and Figs. 10 and 11 of the drawings, it is necessary to so construct the lever j as to allow the bearing part of the float to pass down by the projection or holding part m of said lever when the float descends after each flushing operation. To admit of said operation, said holding part m is hinged in such a manner to the lever as to allow it to swing down when the bearing part of the float comes in contact with it, and at the same time held by a shoulder, m', on the lever against an upward pressure, so as to hold the float when it ascends after each flushing operation, the holding part being sprung back into its normal position after each operation thereof by means of a suitable spring, adapted, according to circumstances, to produce said result.

In the first six figures it will be observed that I use the same spring to spring back both the lever and its holding-finger m, while in Fig. 10 only the finger is operated by the spring, the lever itself being so hinged as to assume its normal position by force of gravity, by arranging the weight thereof mainly upon the side of its pivot opposite from the magnet.

In Fig. 9 the lever j is also shown as being operated to assume its normal position by force of gravity, as above described. By the construction shown in said figure, as well as in Figs. 12 and 13, it is obvious that the necessity of hinging the part m to lever j, as hereinbefore described, is obviated, in this instance the holding part of the lever being prevented from engaging with the float in its downward movement by said holding part bearing against the cylindrical-shaped float shown in Fig. 9, or the rod f, as shown in Figs. 12 and 13, according to which construction is adopted.

Figure 8:
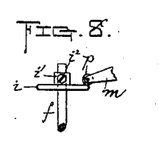

If desired, the operation of withdrawing the holding part of lever j from the bearing part of the float may be considerably facilitated by arranging a friction-roll, p, either upon said bearing part of the float, or the holding part m of the lever, as shown in Fig. 7 and 8, in which case, if a rod, f, is used, said rod being made so that it will not turn in its bearings.

Although I prefer in practice to guide the float in the manner hereinbefore described, the same result may be produced by arranging a float cylindrical in shape in a wire cage, H, as shown in Figs. 9 and 10, whose upward movement is governed by means of a stop, q, projecting down from the frame-work, as is shown in Fig. 9, or by a collar, as hereinbefore described, and shown in Fig. 10, the downward movement of said float being checked by the bottom plate r, of said cage H, which is provided with a central opening to admit of the connection of said float with the valve, as hereinbefore described.

Another method of guiding the float is illustrated in Fig. 11, in this instance, said float having an arm, s, extending laterally therefrom in a similar manner to the arm of the usual supply-cock float shown in Fig. 1, and the up and down motion of said float governed by said arm coming in contact with stationary stops t t', as shown in Fig. 10, said arm s being hinged at s' to the side of tank A, and the float held in a depressed position, and released to open the valve in a similar manner to that hereinbefore described, its holding part m being arranged to bear upon the arm s, as shown, or directly upon the float, as preferred.

Figure 3:
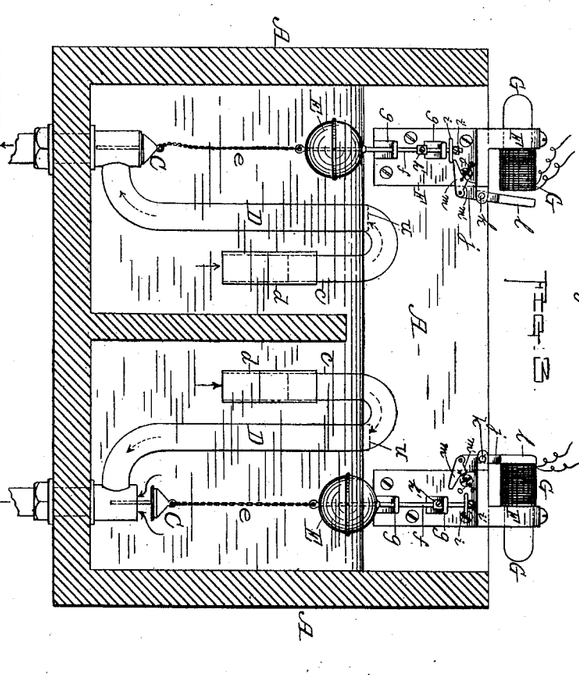
Fig. 3 represents a vertical longitudinal section through the tank shown in Fig. 2, taken on line *a a*, looking in the direction indicated by arrow *a'* of said figure, showing a front view of the two apparatuses shown in Fig. 2, the apparatus at the left-hand side being shown in position when the valve of the tank is seated or closed, and that at the right-hand side when said valve is raised or opened.

As before stated, I prefer in practice to combine my apparatus with a valve having an ordinary siphon connected therewith, as hereinbefore described, for the reason that the most satisfactory results are thereby produced; but, if desired, it may be employed with a valve combined with an overflow-pipe, D', as shown in Fig. 12, and by dotted lines u in Fig. 3, or, as shown in Fig. 13, with said overflow-pipe independent of said valve.

I have shown in Figs. 12 and 13 a valve like the one shown in combination with the siphon hereinbefore described, the standing overflow-pipe D' being shown in Fig. 12 combined with the valve and in Fig. 13 separate therefrom, as hereinbefore stated.

By the adoption of the above method of construction in combination with my apparatus it is obvious that a taut connection is essential between the valve and the bearing part of the float, in order to bring said bearing part below the holding part of lever j after each flushing operation. For this purpose I prefer, in practice, instead of the chain e, a straight rod extending from the valve to said bearing part, as shown in said Figs. 12 and 13.

The amount of wash may be regulated by varying the distance of the float from the valve, as will be obviously seen.

The operation of the valve in connection with the apparatus is substantially the same whether the overflow-pipe D' is combined directly with it, as shown in Fig. 12, or the two arranged separately, as shown in Fig. 13.

The operation of flushing a water-closet by means of my improved apparatus may be briefly summed up as follows: Assuming that a siphon is combined with the valve, that all the parts are in their normal positions, with the water in the tank at its highest level ready to perform said operation, and that a circuit-breaker, I, such as shown in the drawings, is employed, by now pressing upon the push-button w of said circuit-breaker of the electrical apparatus the circuit through the magnet G is closed, thereby attracting the armature l on the hinged lever j toward the same, and, in consequence of thus turning said lever upon its pivot, withdrawing its projection or holding part m from contact with the upward bearing part of the float E, which operation, releasing said float, permits it to spring up with a bound to its stopping-point, lifting the valve with it, as hereinbefore described. The water now commences to flow out rapidly, and produces a strong suction through the siphon, thus starting the flow of water through the same. By this time, as the outflow is much greater than the inflow through the supply-cock, the water has been lowered a sufficient distance to allow the valve to reseat itself and shut off the discharge through the same, as hereinbefore described. It then continues to flow through the siphon and waste-pipe to the water-closet, to wash the bowl J thereof, until the water in the tank is lowered to the bottom of the short arm of said siphon, the amount of wash being governed by the length of said arm, as hereinbefore described.

In operating the apparatus only a short quick pressure is necessary upon the circuit-breaker, as the bearing part of the float, when released, quickly flies upward past the holding part of lever j. Therefore the power of the battery is exhausted only to a trifling extent at each flushing operation.

Figures 14, 15, 16:
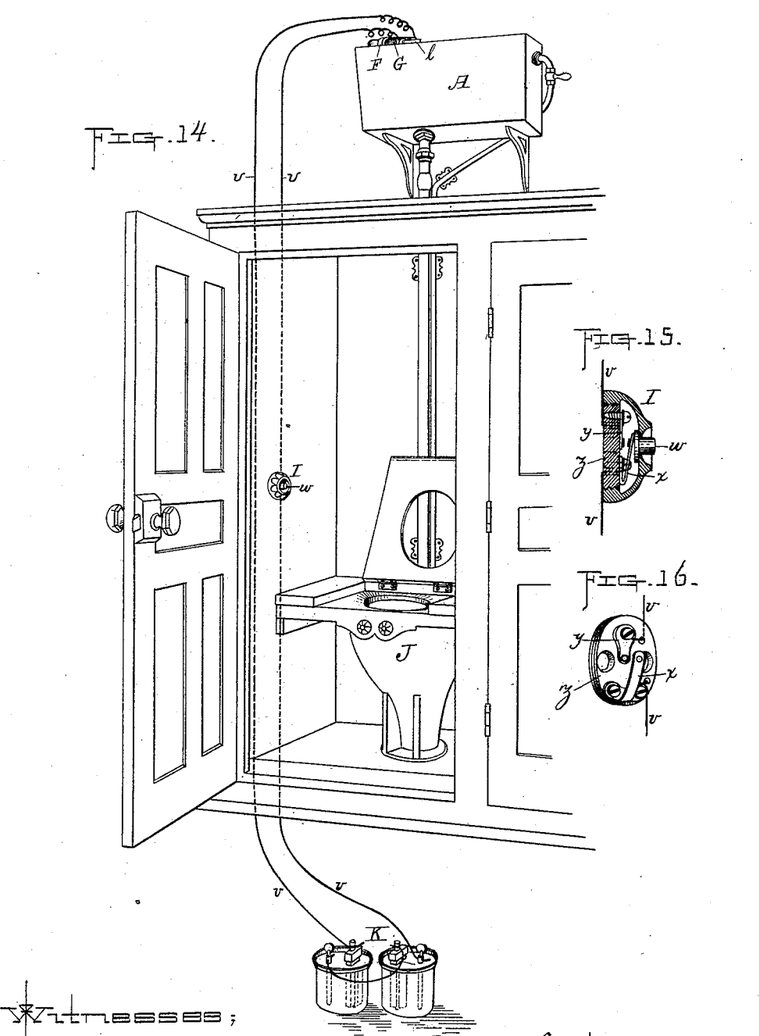
Fig. 14 represents in perspective my improved flushing-tank applied to an ordinary water-closet; also being shown connected with a galvanic battery and a circuit-breaker by means of the usual electric conducting-wires all complete for operation to flush the bowl of said water-closet, as hereinafter more fully described.
Fig. 15 represents a central section of the circuit-breaker shown in Fig. 14.
Fig. 16 is a perspective view of said circuit-breaker with its push-button and cap-piece left off to more clearly illustrate the construction thereof.

The circuit-breaker I (shown in Figs. 14, 15, and 16) is of ordinary well-known construction, and is applied to one of the conducting-wires v in the usual way, the latter being cut apart where said connection is made, and its two parted ends attached to the separate insulated plates x y of said circuit-breaker, as shown in Fig. 16. The inner ends of said plates x y are arranged at a short distance apart, one over the other, and the top plate (x, in this instance) is adapted to be sprung down against the other. The push-button w is also arranged in line with said overlapping ends; therefore, by pressure upon said button the top plate is brought in contact with the bottom one, thus closing the circuit through the parted wire, and in consequence through the whole electrical apparatus shown in Fig. 14.

If desired, any other method of causing a connection between the plates of the circuit-breaker to close the circuit, as aforesaid, may be adopted in lieu of the push-button without departing from the principle of my invention.

I am aware it is not new to operate a flushing apparatus by means of electricity, a United States Patent for such an invention having been already granted to D. W. Hyde, under date of January 5, 1886, and numbered 333,951. I therefore make no claim, in a broad sense, to such application of electricity, but limit my invention to its use in combination with my apparatus hereinbefore described and shown in the drawings.

What I claim as new, and desire to secure by Letters Patent, is—

1. The combination of the valve C, with the chain e, float E, rod f, having collar h' and disk i, mounted thereon, bearings g g, frame-work F, hinged lever j having the armature l, mounted thereon and provided with the hinged holding part m, its pivot k, spring o, and magnet G, all constructed and arranged to operate substantially as shown and described, for the purpose stated.

2. The combination, with the valve of a tank or cistern for flushing water-closets, of an apparatus governed by electricity, consisting of a float, E, a chain or other connection, e, means for guiding said float in substantially a vertical direction, and for controlling its upward and downward movements when in operation, a hinged lever, j, having an armature, l, mounted thereon, an electro-magnet, G, and means for supporting the various parts in position, substantially as and for the purpose set forth.

3. The combination, with the valve of a tank or cistern for flushing water-closets, of float E, a chain or other connection, e, means for guiding said float in substantially a vertical direction, and for controlling its upward and downward movements when in operation, a hinged lever j, having an armature, l, mounted thereon, an electro-magnet, G, a galvanic battery, K, a circuit-breaker, I, the usual electric conducting-wires v v, and means for supporting the various parts in position, all constructed and arranged to operate substantially as and for the purpose set forth.

ALBERT A. BARKER.

Witnesses:
WALTER B. NOURSE,
LUCIUS W. BRIGGS.